Patented Sept. 20, 1932

1,878,962

UNITED STATES PATENT OFFICE

FRIEDRICH MEIDERT, OF FRANKFORT-ON-THE-MAIN, GRIESHEIM, GERMANY, ASSIGNOR TO I. G. FARBENINDUSTRIE AKTIENGESELLSCHAFT, OF FRANKFORT-ON-THE-MAIN, GERMANY

PROCESS FOR PRODUCING SICCATIVES

No Drawing. Application filed October 4, 1930, Serial No. 486,519, and in Germany October 10, 1929.

This invention relates to a process for the direct production of solutions of siccatives. In the paint and varnish industry, siccatives are almost exclusively used in a state of solution in the usual volatile solvents, such as balsam turpentine, lacquer benzine and the like. These solutions have hitherto been prepared from the solid commercial siccatives, either by melting them at temperatures of 140-180° C., and then stirring-in the solvent in a thin stream, or else by crushing the solid siccatives to small fragments and heating them together with the volatile solvent. Both methods waste time and, as is known, are attended with a high fire risk. The solid siccatives themselves are usually prepared by first saponifying, with alkalis, acids (benzoic acid, or naphthenic acid, or various fatty acids) which are known to constitute a basis for siccatives, then precipitating the soap with aqueous solutions of the appropriate heavy-metal or alkaline-earth metal salts, treating the resulting precipitate with water at boiling temperature until the alkali salts have been completely extracted, and, after running off the last washing water, draining and drying the precipitated product. In the case of benzoates, a considerable portion becomes redissolved in the water during this treatment. Alternatively, the solid siccatives can be prepared by the so-called fusion method, the acid being fused directly with the corresponding metallic oxides, hydroxides, acetates and the like. For this purpose, however, a prolonged heating at temperatures of 200-300° C. is necessary and the products obtained in this manner always contain, apart from other by-products, a portion of the organic acid in a free state, so that they are not universally applicable.

According to my invention these protracted operations can be dispensed with and the liquid siccatives can be prepared in a surprisingly simple manner, by dissolving the acids—such as naphthenic acid, linoleic acid, resinic acids, benzoic acid, stearic acid, and the like—in one of the aforesaid solvents and allowing metallic oxides, hydroxides or hydrates of oxides or also carbonates, formates, acetates and the like salts of the usual siccative metals (Co, Mn, Pb, Zn, Al, Ca, and the like) to act on this solution at a gradually increasing temperature and with thorough stirring. These substances are preferably used in the state of fine powder. Quite contrary to expectation, the reaction begins at a comparatively low temperature, and is usually complete in a very short time, even when performed below 100° C. Usually, quantitative conversion is complete in about 2 hours, and the resulting naphthenates, benzoates, linoleates, resinates, or the like, or mixtures of these products have become dissolved in a completely homogeneous condition in the organic solvent. The water formed by the reaction and the volatile organic acid occasionally liberated (such as formic and acetic acids) are most suitably expelled from the solution during or towards the end of the process, by simple distillation, the temperature being raised to about 120-140° C., so that it still remains below the point at which the solvent employed begins to boil. Any portions of solvent that may be carried over are recovered in the receiver. For the sake of completeness, it may be mentioned that if desired, solutions of the siccatives of any desired higher concentration, and finally the solid siccatives, free from solvents, can be obtained from the solution prepared in the hereinbefore described manner by distilling off part or all of the solvent employed.

As already has been mentioned, different acids may be employed concurrently as metal carriers in the present process, and different metallic oxides may likewise be employed jointly. The remarkable observation has been made in this connection that, in such cases, the conversion usually proceeds more quickly and that more highly concentrated solutions of the siccatives can be obtained than when only one acid is used. Thus, for example, if one molecular equivalent of lead oxide and one molecular equivalent of benzoic acid be caused to react in four times the quantity of cyclohexanol, the resulting lead benzoate, although dissolving completely in the warm, separates out again for the most part, in the cold. If however, while operating with the same amount of solvent, one half of a molecular equivalent of lead oxide and one half of a molecular equivalent of naphthenic acid be employed, in addition, the whole of the siccative consisting of lead-benzoate or lead-naphthenate remains in solution in the cold, despite the increased amount of lead present.

It could not be expected that the conversion would proceed so smoothly at such a low temperature. The explanation seems primarily to be that the amounts of siccative formed are retained directly in solution by the solvent, thus enabling the process to continue without restriction until the conversion is complete.

By comparison with the known processes for the production of siccatives, the process of the present invention has the advantage of a considerable saving not only of time and labour, but also of expenditure of heat and chemicals. Any darkening of the colour of the dissolved siccatives, as a consequence of overheating of the solid siccatives, is precluded by this process.

Examples 1. 110 kgs. of benzoic acid, 800 kgs. of cyclohexanone (b. p. 157° C.) and 100 kgs. of lead oxide are placed in a still fitted with stirrers. The charge is warmed, with thorough stirring, until water ceases to pass over, which point can be recognized by the distillate coming over limpid, instead of milky. The reaction is complete, with a final temperature of about 140° C., in about 2 hours. The conversion is quantitative and the result is a solution of lead benzoate.

2. 430 kgs. of naphthenic acid are dissolved in 500 kgs. of commercial "sangajol," a fraction of Borneo petroleum, boiling at about 160–170° C., in a still, and 60 kgs. of finely powdered calcined cobalt acetate are added. Heating is continued, with stirring, until no more acetic acid passes over. The resulting cobalt siccative solution is perfectly limpid and of a deep blue-violet colour.

3. 1000 kgs. of methylcyclohexanol are added to 110 kgs. of benzoic acid and 240 kgs. of naphthenic acid in a still and 100 kgs. of lead oxide and 55 kgs. of cobaltous hydroxide are added. By heating during about 2 hours at a temperature exceeding 100° C. all the water of reaction is distilled over and a clear solution of lead-cobalt siccative is obtained.

4. 100 kgs. of linoleic acid and 330 kgs. of naphthenic acid are dissolved, in the manner hereinbefore described in 1000 kgs. of "sangajol," and 17 kgs. of cobaltous hydroxide and 65 kgs. of manganous hydroxide are added. After the water has been distilled off by heating, the conversion is completed, in about 2 hours.

I claim:

1. The process for producing a siccative which comprises dissolving naphthenic acid in a volatile organic solvent having a boiling point higher than that of water, introducing into said solution an oxygen compound of a metal of the group consisting of cobalt, manganese, lead, zinc, aluminum and calcium, and heating the reaction mixture to a temperature sufficiently high to distil off the water formed by the reaction.

2. The process for producing siccatives which comprises dissolving a mixture of linoleic acid and naphthenic acid in a volatile organic solvent having a boiling point higher than that of water, introducing into said solution a mixture of cobaltous hydroxide and manganous hydroxide and heating the reaction mixture to a temperature sufficiently high to distil off the water formed by the reaction.

3. The process for producing a siccative which comprises dissolving naphthenic acid in a volatile organic solvent, having a boiling point between about 100° C. and 200° C. introducing into said solution an oxygen compound of a metal of the group consisting of cobalt, manganese, lead, zinc, aluminum and calcium, and heating the reaction mixture to a temperature sufficiently high to distil off the water formed by the reaction.

4. The process for producing siccatives which comprises dissolving a mixture of linoleic acid and naphthenic acid in a volatile organic solvent, having a boiling point between about 100° C. and 200° C. introducing into said solution a mixture of cobaltous hydroxide and manganous hydroxide and heating the reaction mixture to a temperature sufficiently high to distil off the water formed by the reaction.

5. In a process for producing a siccative by double decomposition of an organic acid and of a metal compound capable of forming a siccative with said acid the steps which comprise introducing the components in a volatile organic solvent having a boiling point higher than that of the volatile products formed by the double decomposition, and heating the mixture to a temperature sufficiently high to distil off the said voltaile products formed.

6. In a process for producing a siccative by double decomposition of an organic acid and of a metal compound forming a siccative with said acid of the group consisting of oxides, hydroxides of cobalt, manganese, lead, zinc, aluminum, calcium, and of salts of these metals with a volatile organic acid the steps which comprise introducing the components in a volatile organic solvent having a boiling point higher than that of the volatile products formed by the double decomposition, and heating the mixture to a temperature sufficiently high to distil off the said volatile products formed.

In testimony whereof, I affix my signature.

FRIEDRICH MEIDERT.